(12) United States Patent
Orr

(10) Patent No.: US 11,118,350 B2
(45) Date of Patent: Sep. 14, 2021

(54) CONCRETE PANEL BOARD

(71) Applicant: Arts & Labour Artisans Inc., Vancouver (CA)

(72) Inventor: Randy Orr, Vancouver (CA)

(73) Assignee: Arts & Labour Artisans Inc., Delta (CA)

( * ) Notice: Subject to any disclaimer, the term of this patent is extended or adjusted under 35 U.S.C. 154(b) by 387 days.

(21) Appl. No.: 16/144,941

(22) Filed: Sep. 27, 2018

(65) Prior Publication Data

US 2019/0093352 A1    Mar. 28, 2019

Related U.S. Application Data

(60) Provisional application No. 62/564,205, filed on Sep. 27, 2017.

(51) Int. Cl.
| | | |
|---|---|---|
| *E04C 2/04* | (2006.01) |
| *E04C 2/06* | (2006.01) |
| *E04B 2/00* | (2006.01) |
| *E04C 2/26* | (2006.01) |
| *E04B 1/94* | (2006.01) |
| *B32B 13/12* | (2006.01) |
| *B32B 13/10* | (2006.01) |
| *B32B 13/02* | (2006.01) |

(52) U.S. Cl.
CPC ............... *E04C 2/043* (2013.01); *E04C 2/06* (2013.01); *E04C 2/26* (2013.01); *E04C 2/46* (2013.01); *B32B 13/02* (2013.01); *B32B 13/10* (2013.01); *B32B 13/12* (2013.01); *B32B 2255/26* (2013.01); *B32B 2260/044* (2013.01); *B32B 2607/00* (2013.01); *E04B 1/942* (2013.01); *E04B 2103/02* (2013.01); *E04C 2/044* (2013.01)

(58) Field of Classification Search
CPC . E04C 2/043; E04C 2/044; E04C 2/06; E04C 2/26; E04B 1/942; E04B 2103/02; B32B 2250/03; B32B 21/14; B32B 2255/08; B32B 2255/26; B32B 2255/10; B32B 2264/102; B32B 2607/00; B32B 5/16; B32B 13/02; B32B 13/047; B32B 13/10; B32B 13/12
USPC ...................................................... 428/297.4
See application file for complete search history.

*Primary Examiner* — Camie S Thompson
(74) *Attorney, Agent, or Firm* — Oyen Wiggs Green & Mutala LLP

(57) ABSTRACT

A concrete panel board is provided. The panel board includes: a substrate board; a primer layer applied to the substrate; a thinset mortar layer applied to the primer layer; a plaster layer applied to the thinset mortar layer; and a sealant layer applied to the plaster layer.

12 Claims, No Drawings

CONCRETE PANEL BOARD

TECHNICAL FIELD

This invention relates to concrete panel boards and related methods of manufacture.

BACKGROUND

The popularity of the "industrial look" in interior design has led to a rise in the use of concrete. A disadvantage of traditional concrete wall panels is their heavy weight. Heavy panels are costly to transport and difficult to erect or mount. Also, traditional concrete wall panels are difficult to cut not only due to their hardness but also because they generate a significant amount of dust, which is harmful to health. There is a general desire to provide concrete panels that are lightweight and easy to cut.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description is to be regarded in an illustrative, rather than a restrictive, sense.

One aspect of the invention provides a concrete panel board. The concrete panel board of the present invention is economical, lightweight, durable and versatile, and can be readily provided in a variety of colors and textures. The board simulates the appearance, feel and durability of panels formed entirely from concrete. The board has other advantages such as heat and water resistance making it suitable for use in a variety of different building and finishing applications. For example, the board may be used as a finish for any interior design purpose, including but not limited to fireplace surrounds, backsplashes, ceilings, bulkheads, hallways, corridors, feature walls, accent walls, columns, lobbies, furniture and the like. In some embodiments, the concrete panel board may be used for exterior design purposes.

In some embodiments, the concrete panel board includes a substrate, a primer layer, a thinset mortar layer, a plaster layer and a sealant layer.

The substrate may be any rigid board material such as those suitable for use in sheathing. Examples of suitable substrates include engineered wood board, plywood board, gypsum board, polyisocyanurate board, polystyrene board, magnesium oxide board and the like. In particular embodiments, the magnesium oxide board may include magnesium oxychloride, perlite, a reinforcing mesh material and wood dust. In some embodiments the magnesium oxide board may be silica dust free.

The substrate may be provided at a thickness of ¼" or ½", for example. In other embodiments, the substrate may be thinner or thicker depending on the application. Generally the substrate is planar but in some embodiments may be curved or any other shape.

The primer layer may be any preparatory coating that facilitates better subsequent adhesion of the thinset mortar layer. In some embodiments the primer layer may be a water-based styrenated acrylic. The inventor has determined that the primer layer ensures the substrate is sealed for better cutting, strengthened against cracking under heat, and adds a layer of water resistance. The primer layer also facilitates application of the thinset mortar layer since it makes the substrate less absorbent.

The thinset mortar layer is a layer of thinset mortar, also known as thinset cement, dryset mortar and drybond mortar. The properties of thinset mortar are set out in the A118.1 specification of the American National Standards Institute. Thinset mortar is a mixture of cement, sand, a water retention compound, and water. The cement will preferably be portland cement, although other inorganic cements, such as those comprising gypsum or calcium aluminate, may also be used. The thinset mortar layer may be reinforced with microfibers and may be polymer modified.

In some embodiments, the thinset mortar layer may be provided at a thickness of about ¹⁄₁₆" to about ¼", or about ⅛". In other embodiments, the thinset mortar layer may be thinner or thicker depending on the application. A colourant may be added to the thinset mortar layer. The colourant may be a 50/50 mixture of black and white colourant. The colourant may be a mixture of other colourants.

The plaster layer may be lime plaster, gypsum plaster or cement plaster. In some embodiments, the plaster layer may be applied to a thickness of ⅛". In other embodiments, the plaster layer may be thinner or thicker depending on the application. Lime plaster is a preferred plaster, and is essentially pure ground limestone. In some embodiments, only a single layer of lime plaster is applied.

In some embodiments, the thinset mortar layer is thicker than the plaster layer. In particular embodiments, the ratio of thinset mortar to plaster is about 70:30, or about 60:40, or about 50:50. The ratio may depend on the application method and the specified desired finish.

A colourant may be added to the plaster layer. The colourant may be a 50/50 mixture of black and white colourant, to achieve the grey colour of concrete. The colourant may be mixtures of other colourants to achieve other colour values.

The sealant layer may be any sealant capable of sealing the layers from the environment. In some embodiments, one to three layers of sealant may be applied depending on the application. In some embodiments the sealant may comprise acrylic varnish.

In some embodiments the concrete panel board may be fire resistant, water resistant, and mold resistant, in accordance with the specifications of the substrate, such as magnesium oxide board. In embodiments where the concrete panel board need not be fire resistant, and for example only water resistant and mold resistant, a substrate such as polyisocyanurate board or polystyrene board may be used.

In some embodiments, the concrete panel board may be applied to plywood, MDF, drywall, concrete board, concrete, metal, glass and the like.

Due to the thin layer of concrete of the finished concrete panel board, the board is significantly lighter than a concrete panel of equivalent size. The thinness of the concrete layer also makes cutting operations easier, with minimal concrete dust being generated.

The shape, size, and weight of the finished concrete panel board can vary greatly depending on the particular application for which the board is used. However, it is an object of the present invention to provide a concrete panel board that is significantly lighter than traditional concrete panel boards. For example, in some embodiments when using a ½" magnesium oxide board as a substrate, the concrete panel board will have a weight in the range of about 2.0 to about 3.0 pounds per square feet, or about 2.4 to about 2.7 pounds per square feet. In other embodiments when using a ½"

polyisocyanurate board or polystyrene board as a substrate, the concrete panel board will have a weight in the range of about 1.0 to about 2.0 pounds per square feet.

Another aspect of the invention relates to making a concrete panel board as described herein. In each of the steps of manufacture, the layers applied to the substrate may be troweled, brushed, or sprayed on.

After ensuring that the surface of the substrate is clean and dry, a primer layer is applied to one or both surfaces of the substrate. The primer layer is then dried on the board for about an hour at room temperature. Drying time may be longer or shorter depending on the temperature; for example a controlled heat environment may significantly reduce the drying time. Once dried, the primer layer provides a readily adhesive surface for the next, thinset mortar layer.

In some embodiments the surface of the substrate may be prepared for optimal bonding before the application of the primer layer, by for example etching, sanding or other techniques known in the art.

After the primer layer is applied and dried, mortar is prepared by mixing a dry mortar mix with water. In some embodiments, 2 parts of dry mortar mix may be combined with 1 part water, by volume, and mixed with a powered mixing paddle. Colourant may be added at this stage as well. To achieve the grey appearance of concrete, a 50/50 blend of black and white colourant, or other colourant may be added, for example, and mixed into the mortar.

A thin layer of mortar is applied to the primed surface of the board. The layer of mortar may be applied at a thickness of about 1/16" to about 1/4", or about 1/8". The thinset mortar layer is then allowed to dry for about 6 hours at room temperature. Again, drying time may be longer or shorter depending on the temperature.

After the thinset mortar layer is applied and dried, plaster is prepared by mixing with water. Colourant may be added at this stage as well. The plaster may be applied at a thickness of about 1/16" to about 1/4" or about 1/8". Different troweling, brushing, or spraying strokes may be used to introduce subtle colour variations in the plaster layer, and in some embodiments to create the "distressed" concrete appearance.

In some embodiments, before the plaster layer sets, wet sandpaper may be stroked over the surface of the plaster to help emulsify the plaster. In some embodiments, sandpaper of 100 grit to 220 grit, or 150 grit, may be used. Again, different strokes of application may be used to create the aesthetics of the concrete. In some embodiments, wood is applied to the surface to create wood grain finishes. The plaster layer is allowed to dry for 2 to 3 hours at room temperature. Again, drying time may be longer or shorter depending on the temperature.

Lastly, sealant is applied after the plaster is applied and dried. The number of coats of sealant applied depends on the application of the concrete panel board. Applications where moisture will be present may require a greater number of coats of sealant, for example.

Another aspect of the invention relates to providing the materials required to form the concrete panel board according to embodiments of the invention as a kit. Such materials can be pre-mixed, or can be supplied for mixing by the user. The kit can also include containers for mixing and storing the thinset mortar layer and the plaster layer, as well as means for applying the layers to the substrate, such as a trowel, brush or sprayer. The kit can also include a written instruction leaflet explaining how to make and use the concrete panel board in accordance with the embodiments of the invention.

The preferred forms of the invention described above are to be used as illustration only, and should not be used in a limiting sense to interpret the scope of the present invention. Obvious modifications to the exemplary embodiments, set forth above, could be readily made by those skilled in the art without departing from the spirit of the present invention.

The invention claimed is:

1. A concrete panel board comprising:
a substrate board;
a primer layer applied to the substrate;
a thinset mortar layer applied to the primer layer;
a plaster layer applied to the thinset mortar layer; and
a sealant layer applied to the plaster layer.

2. A concrete panel board according to claim 1 wherein the substrate board is selected from the group consisting of engineered wood board, plywood board, gypsum board, polyisocyanurate board, polystyrene board and magnesium oxide board.

3. A concrete panel board according to claim 2 wherein the magnesium oxide board comprises magnesium oxide and perlite.

4. A concrete panel board according to claim 1 wherein a thickness of the substrate board is 1/4" or 1/2".

5. A concrete panel board according to claim 1 wherein the primer layer comprises an acrylic primer.

6. A concrete panel board according to claim 1 wherein the thinset mortar layer comprises fiber reinforced mortar.

7. A concrete panel board according to claim 1 wherein a thickness of the thinset mortar layer is about 1/8".

8. A concrete panel board according to claim 1 wherein the plaster layer is selected from the group consisting of gypsum plaster, lime plaster and concrete plaster.

9. A concrete panel board according to claim 8 wherein the plaster layer comprises lime plaster.

10. A concrete panel board according to claim 1 wherein a thickness of the plaster layer is about 1/8".

11. A concrete panel board according to claim 1 wherein the sealant layer comprises an acrylic varnish.

12. A concrete panel board according to claim 1 wherein the one or more of the thinset mortar layer and the plaster layer comprise a colourant.

* * * * *